(No Model.)
S. P. GIBSON.
HINGE.
No. 454,343. Patented June 16, 1891.
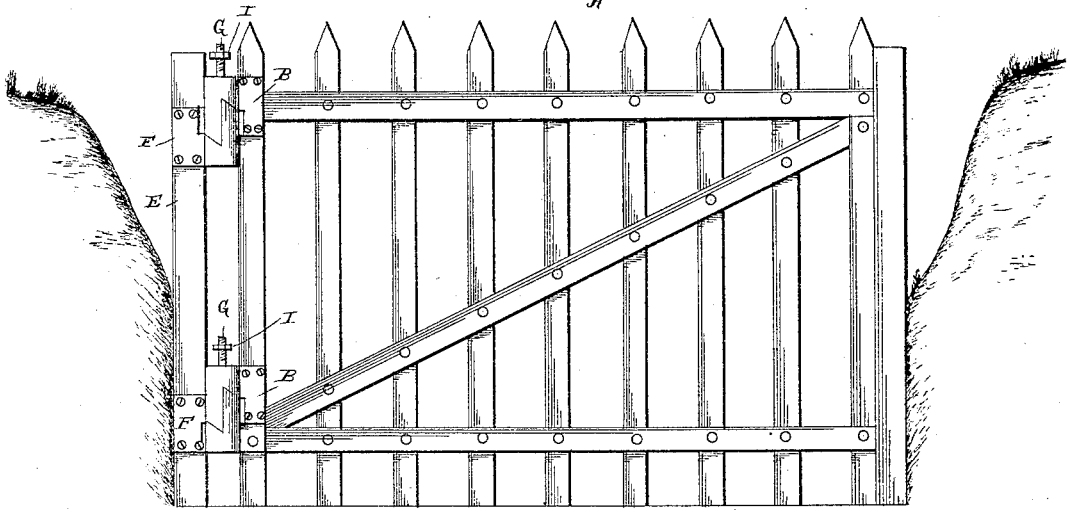
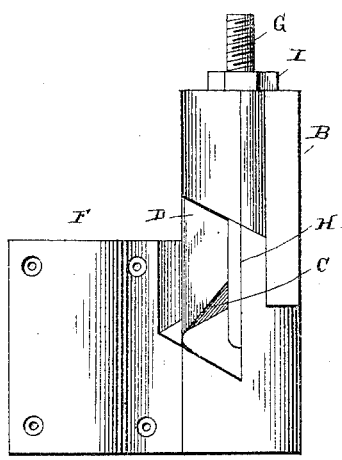
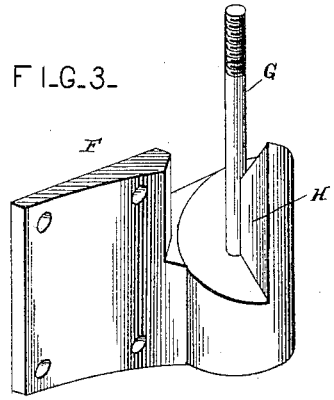
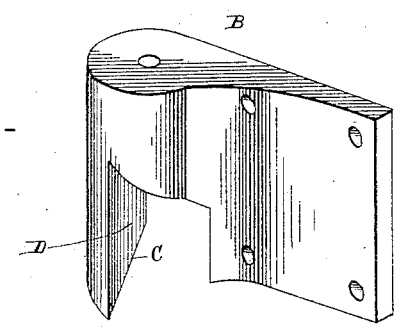
Witnesses.
Geo. E. Frech.
J. M. Nesbit.
Inventor.
S. P. Gibson,
per Lehmann & Pattison,
atty.

UNITED STATES PATENT OFFICE.

SILVERS P. GIBSON, OF RAY'S, OHIO.

HINGE.

SPECIFICATION forming part of Letters Patent No. 454,343, dated June 16, 1891.

Application filed March 23, 1891. Serial No. 386,099. (No model.)

*To all whom it may concern:*

Be it known that I, SILVERS P. GIBSON, of Ray's, in the county of Jackson and State of Ohio, have invented certain new and useful Improvements in Hinges for Flood and Farm Gates; and I do hereby declare the following to be a full, clear, and exact description of the invention, such as will enable others skilled in the art to which it pertains to make and use it, reference being had to the accompanying drawings, which form part of this specification.

My invention relates to an improvement in hinges for flood and farm gates; and it consists in the combination and arrangement of parts, which will be fully described hereinafter, and pointed out in the claim.

Figure 1 is a front elevation of my improved flood-gate shown in position as when across a stream. Fig. 2 is a view of the hinge, showing its position when the gate is swung to one side. Figs. 3 and 4 are detached views of the hinge-sections.

The object of my invention is to construct a flood-gate in such a manner that it may be swung to one side by the water when it is swollen, and to so construct the hinges that the gate will automatically close when the water has fallen.

A represents a flood-gate, to one end of which are secured the sections B of the hinge. These sections B are bored through their centers, and around this central opening the lower ends of the sections are cut away in a downwardly-extending spiral direction, forming the slanting bearing surface C and the shoulder D, as shown in Fig. 4. Secured to the post or other object E are the hinge-sections F, which are provided with the pivotal bolts G, extending upward through their centers. The upper portions of these sections F are spirally cut away, as shown in Fig. 3, to correspond with the spiral surface of the sections B and forming the shoulders H. When the gate is in position, as shown in Fig. 1, the sections of the hinges fit closely together, the shoulders D bearing against the corresponding shoulders H, which form stops, thus preventing the gate from having any backward movement. When the gate is struck by an object floating in the water or by the water itself when swollen, it will swing to one side and in so doing will raise itself upon the slanting surfaces of the stationary sections F of the hinges, as shown in Fig. 2. The gate will stay in this position only so long as the water presses against it, for when free to move it will swing by its own gravity back into position. The pivotal bolts G are screw-threaded at their outer ends and nuts f are run thereon, which limit the upward movement of the sections B and prevent the gate from being floated off by high water.

Either right or left hand hinges may be constructed, as here shown, as may be preferred. The sections may also be reversed, if desired, the section secured to the gate having the pivotal bolt, and the stationary sections the openings through which the bolts pass.

Having thus described my invention, I claim—

In a hinge for flood-gates, the two sections, a pivotal bolt therefor, each section being provided with a spiral bearing-surface which extends entirely around its center, the parts being combined to operate substantially as shown and described.

In testimony whereof I affix my signature in presence of two witnesses.

SILVERS P. GIBSON.

Witnesses:
ROBERT T. HILL,
JAMES M. HUTT.